United States Patent [19]

Garcia

[11] Patent Number: 4,525,821

[45] Date of Patent: Jun. 25, 1985

[54] CROSS

[76] Inventor: Juan R. Garcia, 4235 NW. 167 Ter., Carol City, Fla. 33055

[21] Appl. No.: 589,563

[22] Filed: Mar. 14, 1984

[51] Int. Cl.$^3$ ............................................. A47G 33/02
[52] U.S. Cl. .................................... 369/31; D99/25; 360/12; 428/3
[58] Field of Search .................... D99/25, 27; 360/12; 369/31, 69; 428/3

[56] References Cited

U.S. PATENT DOCUMENTS

| | | | |
|---|---|---|---|
| D. 241,552 | 9/1976 | Timm | D99/27 X |
| 2,520,661 | 8/1950 | Stanley | D99/27 X |
| 2,876,559 | 3/1959 | Sloan | 428/3 X |
| 3,994,502 | 11/1976 | Lombardi | 369/31 |
| 4,365,246 | 12/1982 | DeWolf et al. | 340/782 X |

FOREIGN PATENT DOCUMENTS 2515949  5/1983  France ...................... 428/3

*Primary Examiner*—Henry F. Epstein
*Attorney, Agent, or Firm*—John Cyril Malloy

[57] ABSTRACT

A cross having a recess therein to accommodate and position a tape playing machine with a speaker so that a user can play messages while looking at the cross.

8 Claims, 10 Drawing Figures

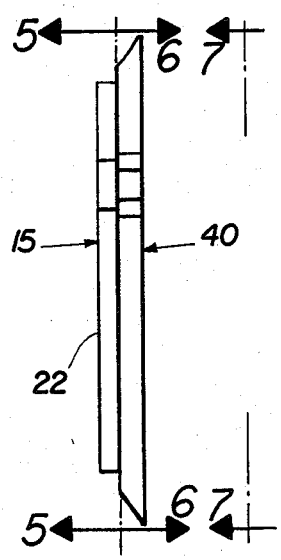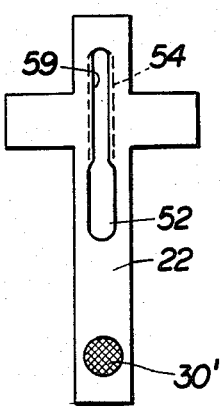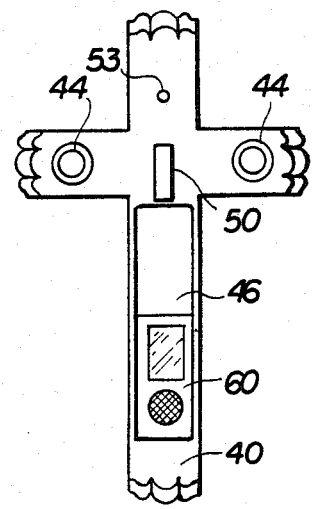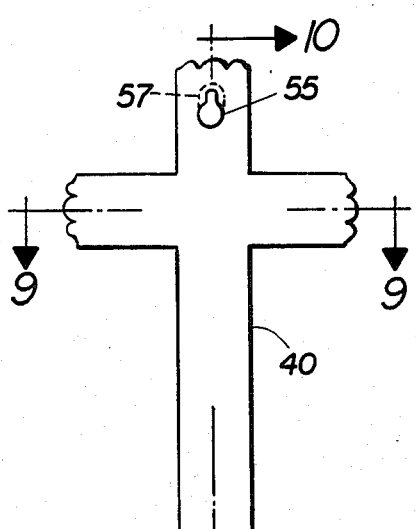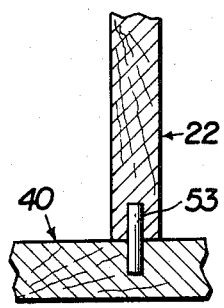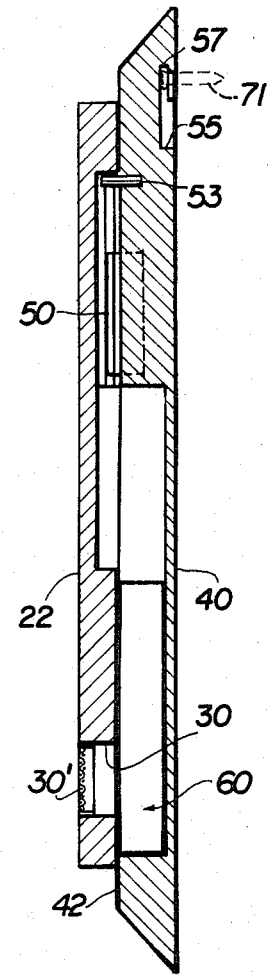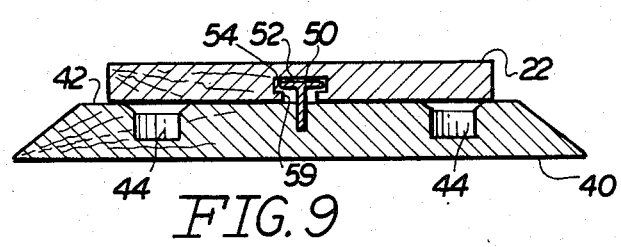

CROSS

FIELD OF THE INVENTION

This invention relates to a cross having a recess therein in which a tape recorder sized and configured to be received within the recess may be positioned for listening to educational, religious or other type of sound recordings.

OBJECT OF THIS INVENTION

It is an object of this invention to provide a device of the type described which is simple and inexpensive to construct, can be arranged in various attitudes, such as on a wall, or with the cross upstanding and mounted on the base when the base is in a horizontal attitude and wherein a recess is provided within the cross in which a tape recording machine which is adapted to play taped messages may be positioned and operated exteriorly of the cross. In the preferred embodiment, the cross is composed of two portions, an outer cross member arranged in overlying relation of an opening or receptacle in a lower cruciform casing.

In accordance with these and other objects which will become apparent hereinafter, the instant invention will now be described with reference to the accompanying drawings, in which:

BRIEF DESCRIPTION OF THE DRAWINGS

FIG. 4 is a view taken on the plane indicated by the line 4—4 of FIG. 1 and looking in the direction of the arrows.

FIG. 5 is a rear view taken on the plane indicated by the line 5—5 of FIG. 4 and looking in the direction of the arrows.

FIG. 6 is a view taken on the plane indicated by the line 6—6 of FIG. 4 and looking in the direction of the arrows.

FIG. 7 is a view taken on the plane indicated by the line 7—7 of FIG. 4 and looking in the direction of the arrows.

FIG. 8 is a view in cross-section taken on the zone indicated by the arrowed line 8—8 in FIG. 2.

FIG. 9 is a view in cross-section taken on the plane indicated by the line 9—9 of FIG. 7 and looking in the direction of the arrows.

FIG. 10 is a view in cross-section taken on the plane indicated by the line 10—10 of FIG. 7 and looking in the direction of the arrows.

DESCRIPTION OF THE PREFERRED EMBODIMENT

Figure 1:
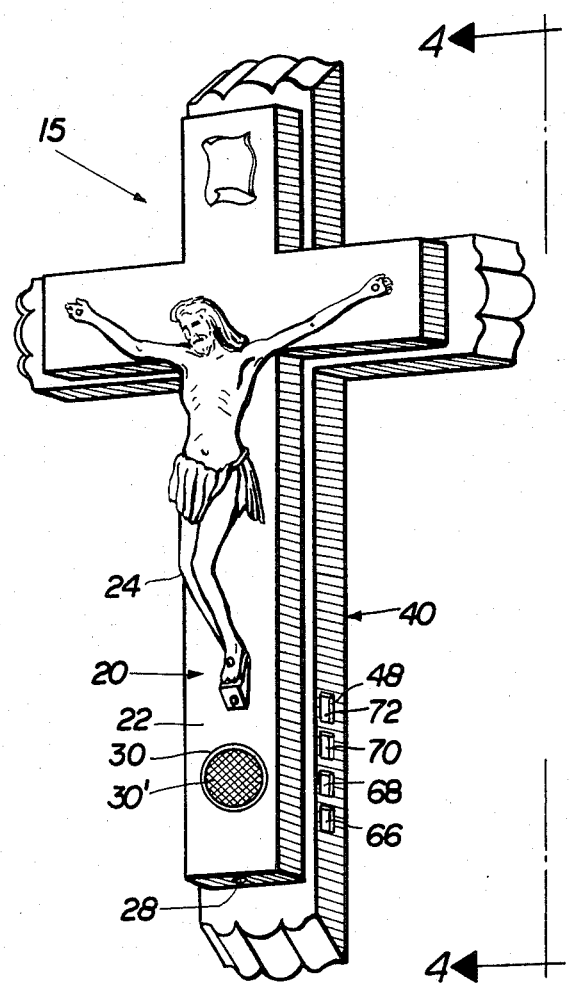
FIG. 1 is a front perspective view of a crucifix in accordance with this invention.
Figure 2:
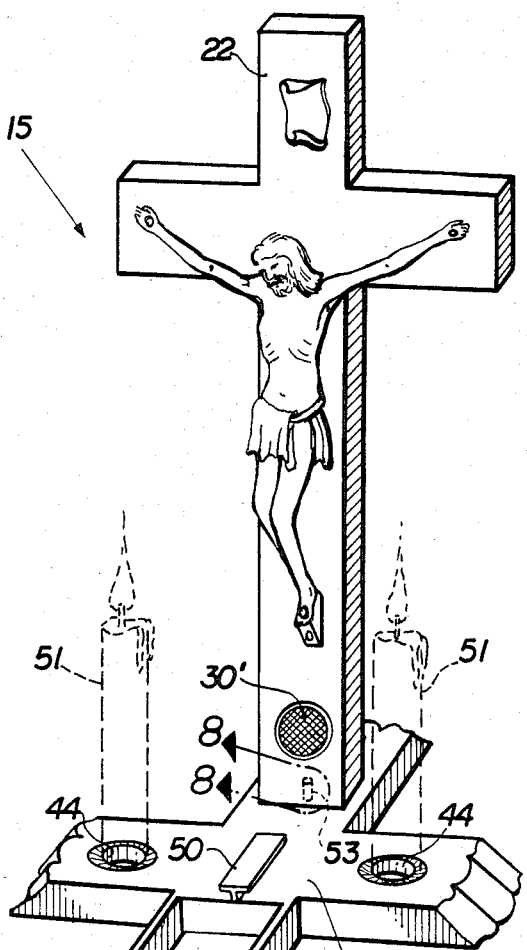
FIG. 2 is a view illustrating one use of the crucifix and the tape playing machine exposed.

Referring to the drawings and particularly to FIG. 2, there is a cross assembly generally designated by the arrowed line 15 which is composed of a figure bearing cross 22 and a casing 40. A figure 24 is arranged on the outer surface of the cross 22. There is an opening 30 in the cross which is covered by a net 30' for a purpose to be explained more fully hereinafter. Also openings are provided in casing 40 and designated by the numeral 48 at the right of FIG. 1 which are for a purpose to be explained more fully hereinafter.

It will be noted that there is a recess 28 which is provided in the base of the cross and a companionately sized and configured pin 53 extending outwardly from outer surface 42 of on the casing 40, see FIG. 8, so that the cross may be positioned in an upright position as shown in FIG. 2 supported by the casing 40 which remains in a horizontal attitude.

With continued reference to FIG. 2, preferably in the outer distal portion of the arms of the casing there are recesses such as 44 to receive, if desired, upstanding candles, such as that designated by the numeral 51. Attachment means, comprising key 50 in FIG. 2, are provided to connect the cross and the casing 40 upstanding key 50 being sized to be received in the recess 52 for sliding engagement along the track 59 with the T-shaped outer arm portions being received in grooves 54 (see FIG. 9). Within the casing 40 there are preferably side opening recesses 48 and there is also provided a main recess 46. The recess 46 is sized and configured to receive a tape playing machine generally designated by the numeral 60 which has a speaker 62 sized and spaced from the end so as to register with the aperture 30 covered by net 30' when the cross 22 is in the vertical attitude. The machine 60 includes also an access door 64 for a tape cassette so that, referring to FIG. 3, when the conventional tape machine buttons 66, 68, 70 and 72 are manipulated, playing of tape may be accomplished by the machine. Manipulation of button 66, 68, 70, and 72 is possible due to their projection through recesses 48 in casing 40. The space 46 is also dimensioned and configured to accommodate receipt and storage of an additional tape.

In the preferred embodiment, on the rear side of the cross, as shown in FIG. 7, there is an opening and recess 57 and 55 to support the cross 22 on a headed nail. When a nail 71 (see FIG. 10) is secured to a wall the cross assembly 15 is oriented in the position shown in FIG. 1 when mounted on the wall as shown.

Figure 3:
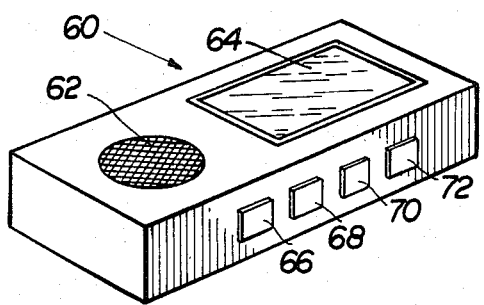
FIG. 3 is a perspective view of the tape playing machine.

It is thus seen that there is provided a cross 22 with a FIG. 24 on it which can be slidably removed, if desired, from and underlying casing 40, to obtain access for changing tapes positioned in the tape machine 60 and operation of the tape machine can be accomplished exteriorly of the cross assembly 15 by manipulation of the operator buttons 66, 68, 70 and 72 extending through the access openings 48, see FIGS. 2 and 3. The device may be displayed on a wall or in a horizontal attitude as desired. Recorded messages may be made such as bible lessons or educational religious information to be played for the benefit of a person utilizing the device.

While the instant invention is shown and described in what is considered to be a practical and preferred embodiment, it is recognized that departures may be made within the spirit and scope of this invention and which is therefore not to be limited except as set forth in the claims which follow and within the doctrine of equivalents.

What is claimed is:

1. A cross assembly comprising:
   (a) a cross and a casing, said cross removably attached to said casing and selectively positionable in supported engagement with said casing and in outwardly extending, upright relation thereto and in overlying substantially parallel position relative thereto, (b) attachment means comprising a pin element extending outwardly from an outer surface of said casing in perpendicular relation thereto and a key element having a substantially elongated configuration and mounted on said casing in spaced apart and aligned relation to said pin element, wherein a central longitudinal axis of said key element is aligned with a central axis of said pin element, (c) said attachment means further comprising a first recess located in a distal end of said cross and dimensioned to receive said pin element therein; a track means formed in an under surface of said cross and dimensioned and configured to simultaneously receive said pin element and said key element therein, (d) said upright position defined by engagement between said pin element and said first recess and said overlying position defined by engagement between said pin element and said key element with said track means, (e) said casing further comprising a main recess formed in said outer surface thereof and dimensioned to receive a tape recording machine therein, a tape recording machine disposed within said main recess and including operator means structured to operate said machine, (f) side opening recess means formed in said casing in communicating relation with said main recess and dimensioned to permit passage therethrough of said operator means for manipulation thereof exteriorly of said casing, and (g) an opening formed in said cross and disposed in overlying relation with said main recess and in substantial registry with a speaker of said tape recording machine.

2. A cross assembly as in claim 1 wherein said casing comprises a cruciform corresponding to and being substantially larger than said cross so as to extend outwardly about the periphery of said cross, said main recess dimensioned and disposed in covered relation by an under-surface of said cross, when said cross is in said overlying position relative to said casing.

3. A cross assembly as in claim 1 wherein said cross has a rear surface and a recess formed in said rear surface and disposed and configured for supporting engagement therein of a nail.

4. A cross assembly as in claim 1 wherein said main recess is sized to receive said tape recording machine therein and provide additional storage space.

5. A cross assembly as in claim 1 wherein said casing includes outwardly extending arm portions disposed in colinear relation to one another and each having distal end zones and recesses formed in each of said distal end zones to support candles therein.

6. A cross assembly as in claim 1 wherein said cross comprises an opening and said tape recording machine has a speaker, said opening and said speaker being positioned in substantial registry with one another wherein said cross is disposed in said overlying position.

7. A cross assembly as in claim 1 wherein said track means comprises a second recess dimensioned substantially greater than said key element so that the latter may pass therethrough, said pin element and said key element concurrently extending into said track means and said pin element disposed in abutting relation to one end thereof, said pin element disposed in at least partially supporting relation to said cross when said cross and said casing are in a substantially vertical orientation.

8. A cross assembly as in claim 7 wherein said track means comprises peripherally disposed grooves extending along oppositely disposed and spaced apart borders of said track means, said key element configured and dimensioned for sliding engagement with said grooves within said track means.

* * * * *